United States Patent
Quinn

(10) Patent No.: US 10,619,284 B2
(45) Date of Patent: Apr. 14, 2020

(54) LAUNDRY TREATING APPLIANCE AND METHOD OF OPERATION

(71) Applicant: WHIRLPOOL CORPORATION, Benton Harbor, MI (US)

(72) Inventor: Daniel E. Quinn, Fall River, MA (US)

(73) Assignee: Whirlpool Corporation, Benton Harbor, MI (US)

(*) Notice: Subject to any disclaimer, the term of this patent is extended or adjusted under 35 U.S.C. 154(b) by 260 days.

(21) Appl. No.: 15/606,210

(22) Filed: May 26, 2017

(65) Prior Publication Data

US 2018/0340283 A1 Nov. 29, 2018

(51) Int. Cl.
| | |
|---|---|
| *D06F 35/00* | (2006.01) |
| *D06F 37/22* | (2006.01) |
| *D06F 37/20* | (2006.01) |
| *D06F 33/02* | (2006.01) |
| *G01H 1/00* | (2006.01) |
| *D06F 23/02* | (2006.01) |

(52) U.S. Cl.
CPC .......... *D06F 35/007* (2013.01); *D06F 37/203* (2013.01); *D06F 37/22* (2013.01); *D06F 23/02* (2013.01); *D06F 33/02* (2013.01); *D06F 2204/065* (2013.01); *D06F 2222/00* (2013.01); *G01H 1/003* (2013.01)

(58) Field of Classification Search
CPC ........ D06F 23/02; D06F 33/02; D06F 35/007; D06F 37/203; D06F 37/22; D06F 2222/00; D06F 2204/065
See application file for complete search history.

(56) References Cited

U.S. PATENT DOCUMENTS

| | | | |
|---|---|---|---|
| 6,715,175 B2 | 4/2004 | Ciancimino et al. | |
| 7,471,054 B2 | 12/2008 | Marioni | |
| 9,096,964 B2 | 8/2015 | Albayrak et al. | |
| 2003/0000262 A1* | 1/2003 | Bruce | D06F 37/203 68/12.06 |
| 2006/0242768 A1* | 11/2006 | Zhang | D06F 37/203 8/159 |
| 2007/0294838 A1* | 12/2007 | Croxton | D06F 37/203 8/158 |
| 2008/0289118 A1* | 11/2008 | Park | D06F 37/203 8/159 |
| 2011/0061177 A1* | 3/2011 | Kappler | D06F 33/02 8/137 |
| 2012/0096737 A1* | 4/2012 | Kmet | D06F 39/003 34/443 |
| 2013/0000053 A1 | 1/2013 | Miller et al. | |

(Continued)

FOREIGN PATENT DOCUMENTS

| | | |
|---|---|---|
| EP | 0507138 A1 | 10/1992 |
| EP | 2977497 A1 | 1/2016 |
| KR | 100548287 B1 | 2/2006 |

*Primary Examiner* — Joseph L. Perrin
(74) *Attorney, Agent, or Firm* — McGarry Bair PC

(57) ABSTRACT

A laundry treating appliance and method of operating a laundry treating appliance that includes wetting the laundry load in a drum according to a selected cycle of operation and determining a magnitude of imbalance of the wetted laundry load. A controller of the laundry treating appliance is configured to determine a first extraction speed for rotating the drum based on the magnitude of imbalance.

14 Claims, 7 Drawing Sheets

(56) References Cited

U.S. PATENT DOCUMENTS

| | | | |
|---|---|---|---|
| 2013/0160219 A1* | 6/2013 | Ashrafzadeh | D06F 33/02 8/137 |
| 2013/0276324 A1* | 10/2013 | Carow | F26B 21/00 34/282 |
| 2014/0259447 A1* | 9/2014 | Alexander | D06F 39/004 8/137 |
| 2014/0326067 A1* | 11/2014 | Chanda | G01N 9/00 73/32 R |
| 2017/0145614 A1* | 5/2017 | Janke | D06F 37/203 |
| 2017/0145619 A1* | 5/2017 | Fugal | D06F 33/02 |

\* cited by examiner

LAUNDRY TREATING APPLIANCE AND METHOD OF OPERATION

BACKGROUND

Laundry treating appliances, such as clothes washers, clothes dryers, refreshers, and non-aqueous systems, may have a configuration based on a rotating drum that defines a treating chamber in which laundry items are placed for treating according to one or more cycles of operation. One or more of the cycles of operation may include rotating the drum at high speeds during a spin or water extraction phase to extract liquid from the laundry items. If a sufficiently large enough load imbalance is present, the laundry treating appliance may experience undesirable vibrations and movements when the drum is rotated at high speeds during the spin phase. If the drum rotation speed during the spin phase is too low, the spin phase may take too long to complete or the desired amount of liquid may not be extracted.

BRIEF SUMMARY

In one aspect the present disclosure relates to a laundry treating appliance and method of operating a laundry treating appliance that includes wetting the laundry load in a drum according to a selected cycle of operation and determining a magnitude of imbalance of the wetted laundry load. A controller of the laundry treating appliance is configured to determine a first extraction speed for rotating the drum based on the magnitude of imbalance. The controller can be configured to provide the magnitude of imbalance as input into an algorithm that provides an output indicative of the first extraction speed, the algorithm comprising at least one non-linear polynomial function. The drum can be rotated at the first extraction speed to extract at least a portion of the liquid carried by the wetted laundry load.

DESCRIPTION

Figure 1:
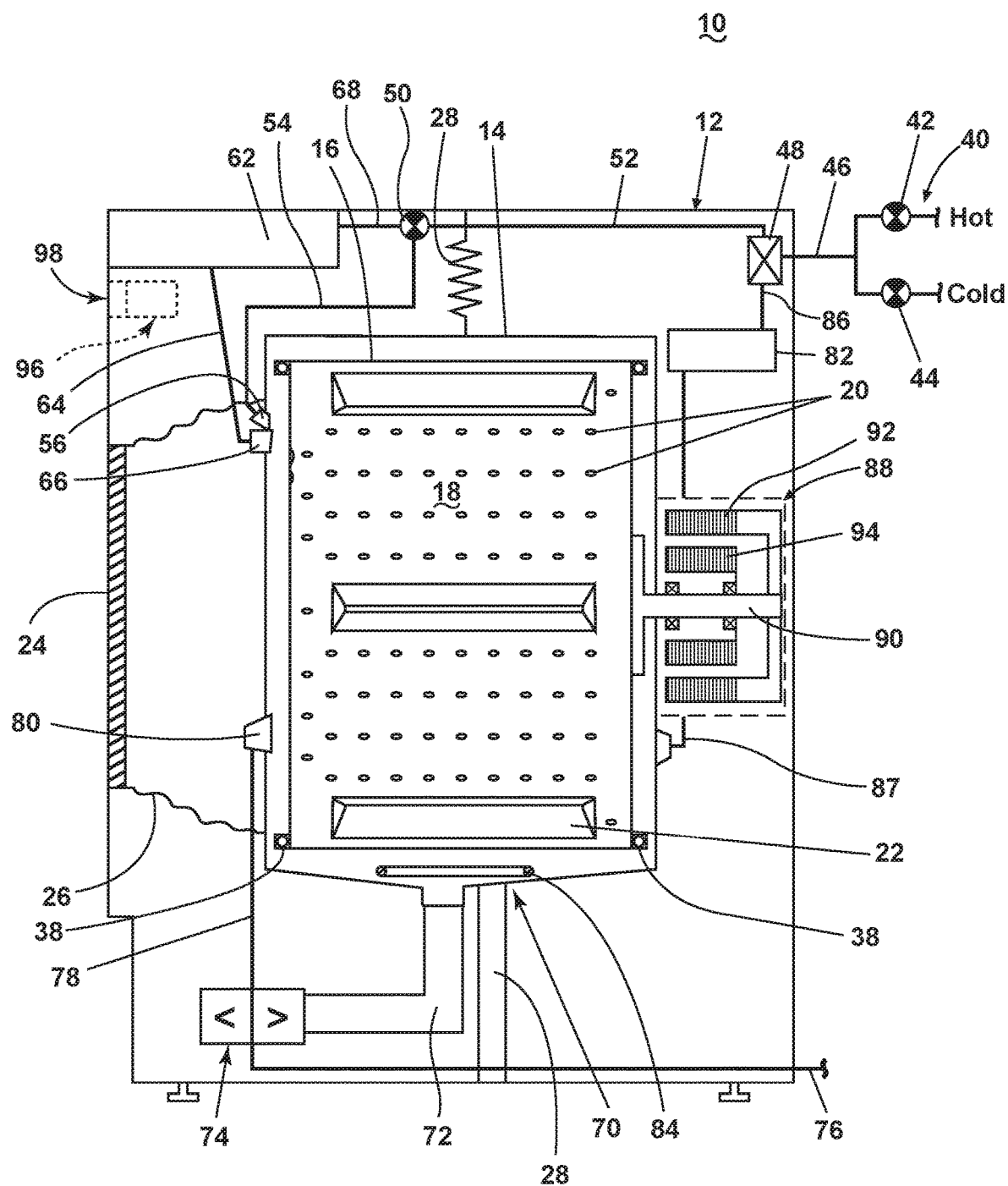
FIG. 1 is a schematic view of a laundry treating appliance in the form of a washing machine.

FIG. 1 is a schematic view of a laundry treating appliance according to an aspect of the present disclosure. The laundry treating appliance may be any appliance which performs an automatic cycle of operation to clean or otherwise treat items placed in a container therein, non-limiting examples of which include a horizontal or vertical axis clothes washer or washing machine; a combination washing machine and dryer; a dispensing dryer; a tumbling or stationary refreshing/revitalizing machine; an extractor; a non-aqueous washing apparatus; and a revitalizing machine. The laundry treating appliance may be a household appliance or a commercial appliance.

As used herein, the term "vertical-axis" washing machine refers to a washing machine having a rotatable drum that rotates about a generally vertical axis relative to a surface that supports the washing machine. However, the rotational axis need not be perfectly vertical to the surface. The drum may rotate about an axis inclined relative to the vertical axis, with fifteen degrees of inclination being one example of the inclination. Similar to the vertical axis washing machine, the term "horizontal-axis" washing machine refers to a washing machine having a rotatable drum that rotates about a generally horizontal axis relative to a surface that supports the washing machine. The drum may rotate about the axis inclined relative to the horizontal axis, with fifteen degrees of inclination being one example of the inclination.

The laundry treating appliance of FIG. 1 is illustrated as a horizontal-axis washing machine 10, which may include a structural support system including a cabinet 12 which defines a housing within which a laundry holding system resides. The cabinet 12 may be a housing having a chassis and/or a frame, defining an interior enclosing components typically found in a conventional washing machine, such as motors, pumps, fluid lines, controls, sensors, transducers, and the like. Such components will not be described further herein except as necessary for a complete understanding of the invention.

The laundry holding system includes a tub 14 supported within the cabinet 12 by a suitable suspension system and a drum 16 provided within the tub 14, the drum 16 defining at least a portion of a laundry treating chamber 18 for receiving a laundry load for treatment. The drum 16 may include a plurality of perforations 20 such that liquid may flow between the tub 14 and the drum 16 through the perforations 20. A plurality of baffles 22 may be disposed on an inner surface of the drum 16 to lift the laundry load received in the treating chamber 18 while the drum 16 rotates. It may also be within the scope of the present disclosure for the laundry holding system to include only a tub with the tub defining the laundry treating chamber.

The laundry holding system may further include a door 24 which may be movably mounted to the cabinet 12 to selectively close both the tub 14 and the drum 16. A bellows 26 may couple an open face of the tub 14 with the cabinet 12, with the door 24 sealing against the bellows 26 when the door 24 closes the tub 14. The washing machine 10 may further include a suspension system 28 for dynamically suspending the laundry holding system within the structural support system.

The washing machine 10 may optionally include at least one balance ring 38 containing a balancing material moveable within the balance ring 38 to counterbalance an imbalance that may be caused by laundry in the treating chamber 18 during rotation of the drum 16. More specifically, the balance ring 38 may be coupled with the rotating drum 16 and configured to compensate for a dynamic imbalance during rotation of the rotatable drum 16. The balancing material may be in the form of balls, fluid, or a combination thereof. The balance ring 38 may extend circumferentially around a periphery of the drum 16 and may be located at any desired location along an axis of rotation of the drum 16. When multiple balance rings 38 are present, they may be equally spaced along the axis of rotation of the drum 16. For example, in the illustrated example a plurality of balance rings 38 are included in the washing machine 10 and the plurality of balance rings 38 are operably coupled with opposite ends of the rotatable drum 16.

The washing machine 10 may further include a liquid supply system for supplying water to the washing machine 10 for use in treating laundry during a cycle of operation. The liquid supply system may include a source of water, such as a household water supply 40, which may include separate valves 42 and 44 for controlling the flow of hot and cold water, respectively. Water may be supplied through an inlet conduit 46 directly to the tub 14 by controlling first and second diverter mechanisms 48 and 50, respectively. The diverter mechanisms 48, 50 may be a diverter valve having two outlets such that the diverter mechanisms 48, 50 may selectively direct a flow of liquid to one or both of two flow paths. Water from the household water supply 40 may flow through the inlet conduit 46 to the first diverter mechanism 48 which may direct the flow of liquid to a supply conduit 52. The second diverter mechanism 50 on the supply conduit 52 may direct the flow of liquid to a tub outlet conduit 54 which may be provided with a spray nozzle 56 configured to spray the flow of liquid into the tub 14. In this manner, water from the household water supply 40 may be supplied directly to the tub 14.

The washing machine 10 may also be provided with a dispensing system for dispensing treating chemistry to the treating chamber 18 for use in treating the laundry according to a cycle of operation. The dispensing system may include a dispenser 62 which may be a single use dispenser, a bulk dispenser or a combination of a single use and bulk dispenser.

Regardless of the type of dispenser used, the dispenser 62 may be configured to dispense a treating chemistry directly to the tub 14 or mixed with water from the liquid supply system through a dispensing outlet conduit 64. The dispensing outlet conduit 64 may include a dispensing nozzle 66 configured to dispense the treating chemistry into the tub 14 in a desired pattern and under a desired amount of pressure. For example, the dispensing nozzle 66 may be configured to dispense a flow or stream of treating chemistry into the tub 14 by gravity, i.e. a non-pressurized stream. Water may be supplied to the dispenser 62 from the supply conduit 52 by directing the diverter mechanism 50 to direct the flow of water to a dispensing supply conduit 68.

Non-limiting examples of treating chemistries that may be dispensed by the dispensing system during a cycle of operation include one or more of the following: water, enzymes, fragrances, stiffness/sizing agents, wrinkle releasers/reducers, softeners, antistatic or electrostatic agents, stain repellants, water repellants, energy reduction/extraction aids, antibacterial agents, medicinal agents, vitamins, moisturizers, shrinkage inhibitors, and color fidelity agents, and combinations thereof.

The washing machine 10 may also include a recirculation and drain system for recirculating liquid within the laundry holding system and draining liquid from the washing machine 10. Liquid supplied to the tub 14 through the tub outlet conduit 54 and/or the dispensing supply conduit 68 typically enters a space between the tub 14 and the drum 16 and may flow by gravity to a sump 70 formed in part by a lower portion of the tub 14. The sump 70 may also be formed by a sump conduit 72 that may fluidly couple the lower portion of the tub 14 to a pump 74. The pump 74 may direct liquid to a drain conduit 76, which may drain the liquid from the washing machine 10, or to a recirculation conduit 78, which may terminate at a recirculation inlet 80. The recirculation inlet 80 may direct the liquid from the recirculation conduit 78 into the drum 16. The recirculation inlet 80 may introduce the liquid into the drum 16 in any suitable manner, such as by spraying, dripping, or providing a steady flow of liquid. In this manner, liquid provided to the tub 14, with or without treating chemistry may be recirculated into the treating chamber 18 for treating the laundry within.

The liquid supply and/or recirculation and drain system may be provided with a heating system which may include one or more devices for heating laundry and/or liquid supplied to the tub 14, such as a steam generator 82 and/or a sump heater 84. Liquid from the household water supply 40 may be provided to the steam generator 82 through the inlet conduit 46 by controlling the first diverter mechanism 48 to direct the flow of liquid to a steam supply conduit 86. Steam generated by the steam generator 82 may be supplied to the tub 14 through a steam outlet conduit 87. The steam generator 82 may be any suitable type of steam generator such as a flow through steam generator or a tank-type steam generator. Alternatively, the sump heater 84 may be used to generate steam in place of or in addition to the steam generator 82. In addition or alternatively to generating steam, the steam generator 82 and/or sump heater 84 may be used to heat the laundry and/or liquid within the tub 14 as part of a cycle of operation.

Additionally, the liquid supply and recirculation and drain system may differ from the configuration shown in FIG. 1, such as by inclusion of other valves, conduits, treating chemistry dispensers, sensors, such as water level sensors and temperature sensors, and the like, to control the flow of liquid through the washing machine 10 and for the introduction of more than one type of treating chemistry.

The washing machine 10 also includes a drive system for rotating the drum 16 within the tub 14. The drive system may include a motor 88 for rotationally driving the drum 16. The motor 88 may be directly coupled with the drum 16 through a drive shaft 90 to rotate the drum 16 about a rotational axis during a cycle of operation. The motor 88 may be a brushless permanent magnet (BPM) motor having a stator 92 and a rotor 94. Alternately, the motor 88 may be coupled with the drum 16 through a belt and a drive shaft to rotate the drum 16, as is known in the art. Other motors, such as an induction motor or a permanent split capacitor (PSC) motor, may also be used. The motor 88 may rotationally drive the drum 16 including that the motor 88 may rotate the drum 16 at various speeds in either rotational direction.

The washing machine 10 also includes a control system for controlling the operation of the washing machine 10 to implement one or more cycles of operation. The control system may include a controller 96 located within the cabinet 12 and a user interface 98 that may be operably coupled with the controller 96. The user interface 98 may include one or more knobs, dials, switches, displays, touch screens and the like for communicating with the user, such as to receive input and provide output. The user may enter different types of information including, without limitation, cycle selection and cycle parameters, such as cycle options.

The controller 96 may include the machine controller and any additional controllers provided for controlling any of the components of the washing machine 10. For example, the controller 96 may include the machine controller and a motor controller. Many known types of controllers may be used for the controller 96. It is contemplated that the controller may be a microprocessor-based controller that implements control software and sends/receives one or more electrical signals to/from each of the various working components to effect the control software. As an example, proportional control (P), proportional integral control (PI), and proportional derivative control (PD), or a combination thereof, a proportional integral derivative control (PID control), may be used to control the various components.

Figure 2:
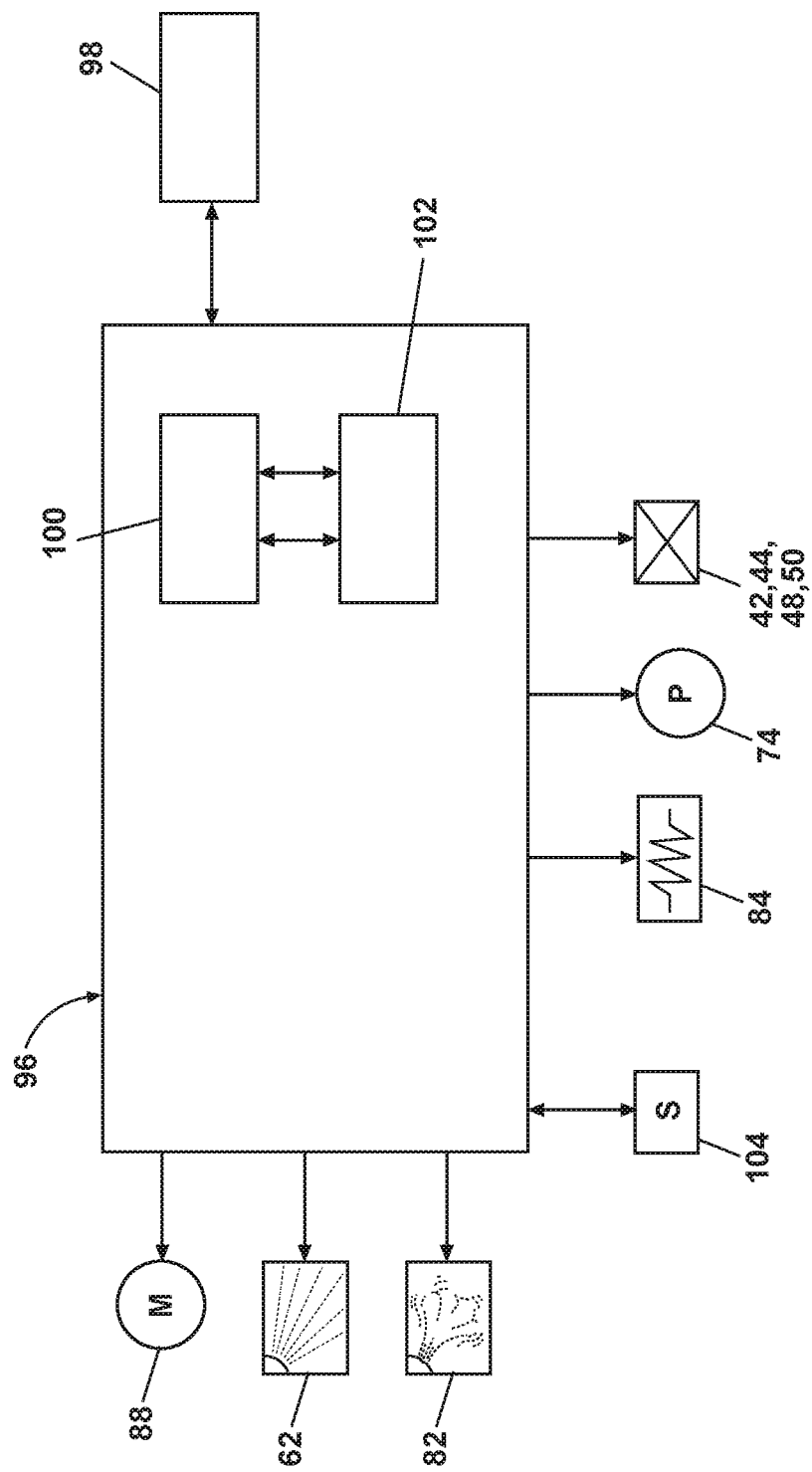
FIG. 2 is a schematic of a control system of the laundry treating appliance of FIG. 1 according to an aspect of the present disclosure.

As illustrated in FIG. 2, the controller 96 may be provided with a memory 100 and a central processing unit (CPU) 102. The memory 100 may be used for storing the control software that may be executed by the CPU 102 in completing a cycle of operation using the washing machine 10 and any additional software. Examples, without limitation, of cycles of operation include: wash, heavy duty wash, delicate wash, quick wash, pre-wash, refresh, rinse only, and timed wash. The memory 100 may also be used to store information, such as a database or table, and to store data received from one or more components of the washing machine 10 that may be communicably coupled with the controller 96. The database or table may be used to store the various operating parameters for the one or more cycles of operation, including factory default values for the operating parameters and any adjustments to them by the control system or by user input.

The controller 96 may be operably coupled with one or more components of the washing machine 10 for communicating with and controlling the operation of the component to complete a cycle of operation. For example, the controller 96 may be operably coupled with the motor 88, the pump 74, the dispenser 62, the steam generator 82, and the sump heater 84 to control the operation of these and other components to implement one or more of the cycles of operation.

The controller 96 may also be coupled with one or more sensors 104 provided in one or more of the systems of the washing machine 10 to receive input from the sensors, which are known in the art and not shown for simplicity. Non-limiting examples of sensors 104 that may be communicably coupled with the controller 96 include: a treating chamber temperature sensor, a moisture sensor, a weight sensor, a chemical sensor, a position sensor, an imbalance sensor, a load size sensor, and a motor torque sensor, which may be used to determine a variety of system and laundry characteristics, such as laundry load inertia, mass, and imbalance magnitude.

A typical cycle of operation generally includes multiple phases depending on the intended purpose of the cycle. For example, a conventional wash cycle of operation includes at least three phases: a wash phase, a rinse phase, and an extraction phase (also referred to as spin phase). These three wash cycle phases may be supplemented by additional phases, such as a pre-treatment or a stain removal phase, for example, based on the selected cycle of operation. Optionally, one or more of the phases may be repeated, such as the rinse phase. In general, during the wash phase, the laundry load is treated with a liquid that includes a treating chemistry to facilitate removing soil and stains from the laundry. During the rinse phase, water is supplied to the laundry load to remove residual treating chemistry and/or soil, as desired. The extraction phase includes rotating the laundry load at high speeds to extract liquid from the laundry load prior to the end of the cycle. Removal of liquid from the laundry load at the end of the wash cycle can decrease the amount of energy and/or time required to dry the laundry load after completion of the laundry load.

The washing machine 10 may extract liquid from the laundry items located within the treating chamber 18 forming the laundry load during a cycle of operation by rotating the drum 16 about the drum rotational axis such that inertia causes liquid to be extracted from the laundry items. Extraction rotation speeds, also referred to as spin speeds, are typically high in order to extract the desired amount of liquid from the laundry items in a short amount of time, thus saving time and energy. However, when the laundry items and liquid are not evenly distributed about the rotational axis of the drum 16 and/or unevenly distributed about the circumference of the drum, an imbalance condition may occur.

Typical spin speeds in a horizontal axis washer are about 800-2000 RPM and provide an inertial force of 1 G or greater, sometimes even up to and greater than 400 G, to the laundry items. At such high speeds, an imbalance can result in unacceptable vibratory movement of the tub 14, the drum 16, and even the entire washing machine 10. The washing machine 10 can be affected severely enough that it may exhibit a side-to-side movement, when viewed from the front/rear, which results in a "walking" across the floor and cause floor vibration. The tub 14 can move enough such that the tub 14 reaches the limit of its suspension and/or contacts the surrounding cabinet 12, referred to as "cabinet hits," with consequent noise and possible damage. In addition, the imbalance can also cause the drum 16 to move relative to the tub 14 to such an extent that the drum 16 contacts the surrounding tub 14, with consequent noise and possible damage.

As used herein, rotating the drum 16 at an extraction speed, referred to interchangeably as a spin speed, refers to rotating the drum 16 to apply an inertial force of greater than or equal to 1 G to at least some of the laundry items. Spin speeds are high rotation speeds that result in the laundry items being held by inertial force against the inner surface of the drum 16 as the drum 16 rotates, also sometimes referred to as a satellizing or plastering condition. For a horizontal axis washing machine 10, the drum 16 may rotate about an axis that may be inclined relative to the horizontal, in which case the term "1 G" refers to the vertical component of the inertial force vector, and the total magnitude along the inertial force vector would therefore be greater than 1 G.

As described herein, the term "imbalance" or "unbalance," when used alone or in combination with the words "condition," "mass," "phase," "magnitude," "position," or otherwise, refers to an object being in a state of unbalance relative to its respective reference frame, i.e., an object positioned in a washing machine so as to shift the center of gravity, or the orientation of the principal axis, of a rotating inertial mass away from the longitudinal axis of the rotating shaft in the washing machine.

Generally, an extraction phase involves rotating the drum 16 at a final spin or extraction speed for a predetermined period of time to extract at least a portion of the liquid carried by the laundry, after which the drum speed is decreased and the extraction phase is ended. The final spin speed is often a maximum allowable speed for rotating the drum 16 based on a predetermined set of conditions, such as the size of the laundry load and/or an amount of unbalance in the load, for example. The extraction phase can include multiple sections or sub-phases leading up to rotating the drum 16 at the maximum allowable spin speed to extract liquid from the laundry load. For example, the extraction phase can optionally include a tumbling section in which the drum 16 is alternately rotated clockwise and counterclockwise at slow speeds, less than a spin speed, to facilitate distribution of the laundry load. In another example, the extraction phase can include an imbalance magnitude detection section in which a magnitude of imbalance of the laundry load is determined before the laundry is rotated at a spin speed to extract liquid. The tumbling and imbalance magnitude detection sections may optionally be considered separate phases, independent of the extraction phase.

Figure 3:
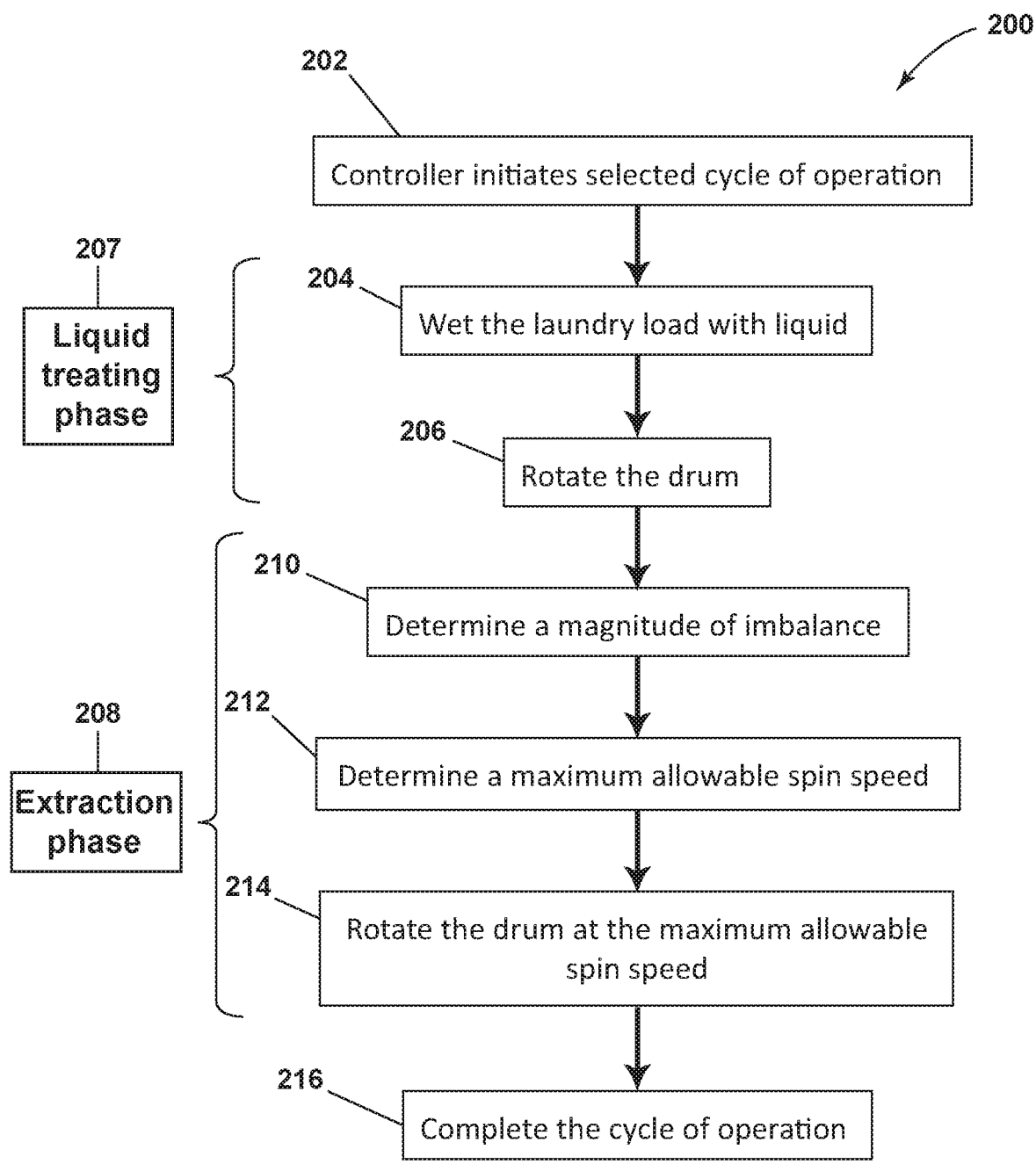
FIG. 3 is a flow chart illustrating a method of operating the laundry treating appliance according to an aspect of the present disclosure.

Referring now to FIG. 3, a flow chart of a method 200 for operating a laundry treating appliance, such as the washing machine 10, is illustrated. The sequence depicted for this method is for illustrative purposes only, and is not meant to limit the method in any way as it is understood that the steps may proceed in a different logical order or additional or intervening steps may be included without detracting from the present disclosure.

One manner in which the likelihood of unacceptable vibratory movements of the tub 14, the drum 16, and/or other components of the washing machine 10 can be decreased during an extraction phase is to limit the speed at which the drum 16 is rotated based upon a magnitude of imbalance of the laundry load. The method 200 can be used to determine a maximum allowable spin speed for rotating the laundry load during an extraction phase to extract liquid from the laundry based on inputting a magnitude of imbalance of the laundry load prior to spinning at a spin speed into an algorithm that includes at least one non-linear polynomial function.

The method 200 begins assuming that a user has placed laundry items to be treated into the treating chamber 18 and selected a cycle of operation through the user interface 98. The method 200 may be used with any cycle of operation that includes wetting the laundry load with liquid, non-limiting examples of which include a wash cycle, a rinse cycle, and a treatment aid cycle. At 202, the controller 96 initiates the selected cycle of operation and controls the liquid supply system and the dispensing system to wet the laundry items with water and/or a treating chemistry according to the selected cycle of operation at 204. At 206, the drum 16 may be rotated according the selected cycle of operation to facilitate wetting the laundry items with water and/or a dispensed treating chemistry. The wetting of the laundry items and rotating the drum at 204 and 206 may be implemented one or more times based on the selected cycle of operation as part of a liquid treating phase 207. In one example, the wetting of the laundry items and rotating the drum at 204 and 206 occurs at least once as part of a pre-wash phase, a wash phase and/or a rinse phase of the selected cycle of operation. In another example, the wetting of the laundry items and rotating the drum at 204 and 206 occurs as part of a treatment aid phase in which the laundry items are treated with a treatment aid, non-limiting examples of which include a whitening agent, a stain removal agent, and an anti-wrinkle agent.

Following the liquid treating phase 207, an extraction phase 208 may be implemented to remove at least a portion of the liquid supplied during the liquid treating phase 207 and carried by the laundry load. Prior to increasing the drum speed to a maximum allowable spin speed in the extraction phase 208, a magnitude of imbalance of the laundry load may be determined at 210 according to any suitable method known in the art. Non-limiting exemplary methods for determining the magnitude of imbalance include those disclosed in U.S. Pub. No. 2013/0000053, published Jan. 3, 2013, and entitled "Laundry Treating Appliance with Method to Reduce Drum Excursions," which is incorporated herein by reference in its entirety. Another exemplary method for determining the magnitude of imbalance includes determining a magnitude of imbalance based on changing forces experienced by the motor during rotation of the drum 16. While determining the magnitude of imbalance at 210 is described in the context of being part of the extraction phase 208, the determination of the magnitude of imbalance at 210 may be considered as a separate phase, distinct from the extraction phase 208.

The magnitude of imbalance determined at 210 can be used at 212 to determine a maximum allowable extraction speed for rotating the drum during the extraction phase 208 to extract at least a portion of the liquid carried by the laundry load. An extraction speed algorithm can be stored in the memory 100 for determining the maximum extraction speed based on the magnitude of imbalance output at 210. The extraction speed algorithm can include one or more functions configured to receive the magnitude of imbalance determined at 210 as input and provide an output indicative of the maximum allowable extraction speed. The controller 96 can be configured to control the motor 88 to rotate the drum 16 at the maximum allowable extraction speed at 214 based on the output from 212.

The extraction speed algorithm includes at least one non-linear polynomial function configured to receive the magnitude of imbalance determined at 210 as input and provide an output indicative of the maximum allowable extraction speed at which the drum 16 is to be rotated to extract liquid from the laundry load. It will be understood that when the extraction speed algorithm includes a single function, that single function is a non-linear polynomial function. When the extraction speed algorithm includes more than one function, at least one of the functions is a non-linear polynomial function, however, the additional functions may be a linear function, a non-linear polynomial function, an exponential function, or any other type of function. The one or more functions of the extraction speed algorithm provide a unique output indicative of a unique maximum allowable extraction speed for each magnitude of imbalance determined at 210.

The drum 16 can be rotated at the maximum allowable extraction speed at 214 for a predetermined period of time or until one or more characteristics of the laundry load is satisfied. For example, the drum 16 can be rotated at 214 for a predetermined period of time based on an amount of laundry, the selected cycle of operation, a selected degree of dryness of the load, and/or selected maximum time for the selected cycle of operation. In another example, the drum 16 can be rotated at 214 until a predetermined amount of liquid has been extracted from the laundry. In another example, the drum 16 can be rotated at 214 until a remaining moisture content (RMC) of the laundry satisfies a predetermined RMC threshold. The term "satisfies" the threshold is used herein to mean that the variation satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted. One example of determining the RMC during the extraction phase may be based on the methods disclosed in U.S. application Ser. No. 15/606,188, entitled "Laundry Treating Appliance and Method of Operation," filed on May 26, 2017, now allowed, which is herein incorporated by reference in its entirety.

At 216, the cycle of operation can be completed subsequent to spinning the drum 16 at the maximum allowable extraction speed. The cycle of operation can be completed by rotating the drum 16 at a speed less than the maximum allowable extraction speed, which can include actively braking the drum 16 and/or allowing the drum 16 to coast to a lower speed of rotation. Completion of the cycle of operation optionally includes treatment of the laundry with one or more treatment aids, non-limiting examples of which include fragrances, anti-wrinkle agents, anti-shrinkage agents, leave-in fabric softeners, and color protectors. Prior to ending the cycle of operation at 216, the liquid treating phase 207 and the extraction phase 208 can be repeated one or more times based on the selected cycle of operation.

Figure 4:
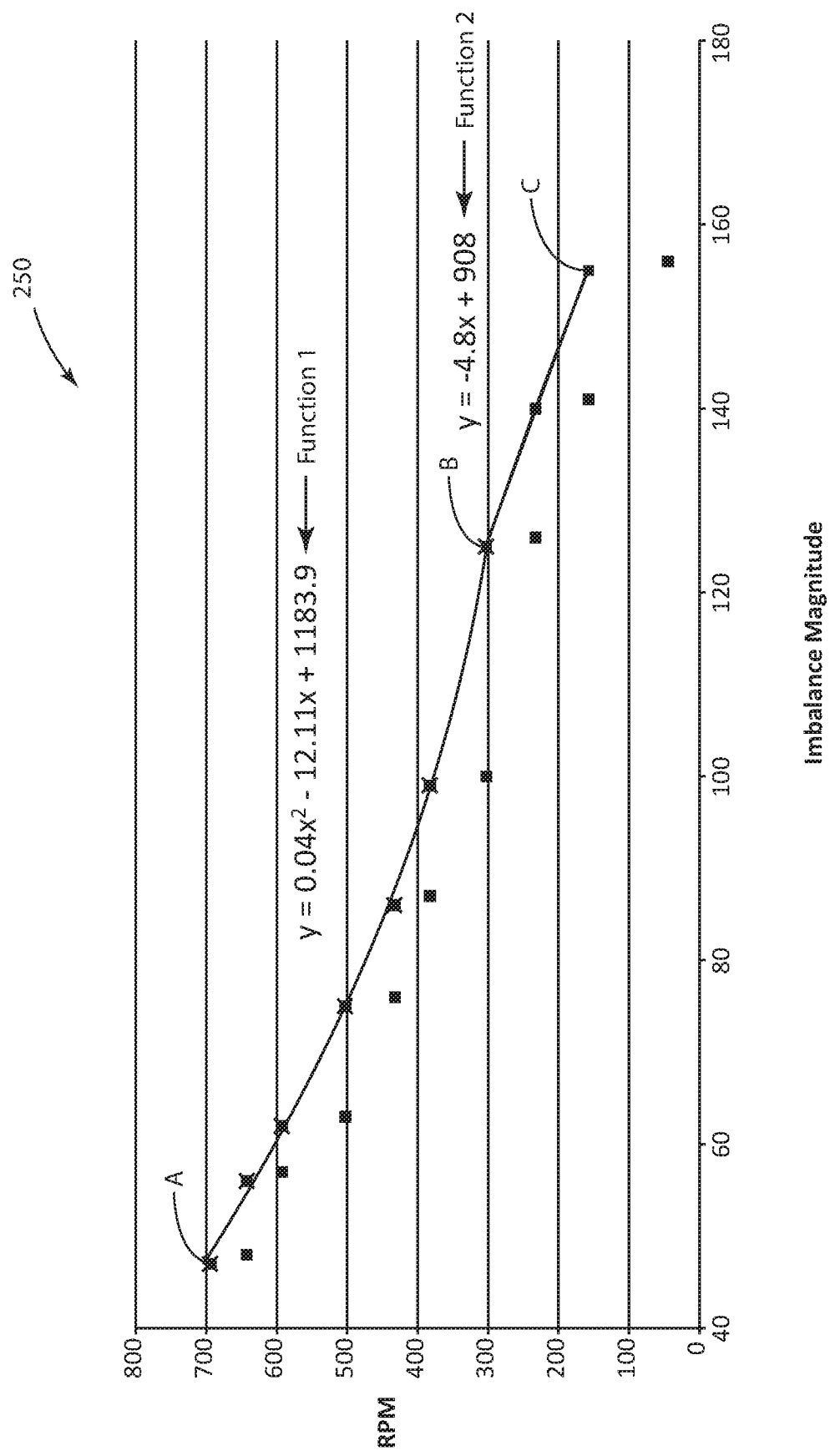
FIG. 4 is a graph representative of a speed of rotation of a laundry drum as a function of an imbalance magnitude of the laundry load according to an aspect of the present disclosure.
Figure 5:
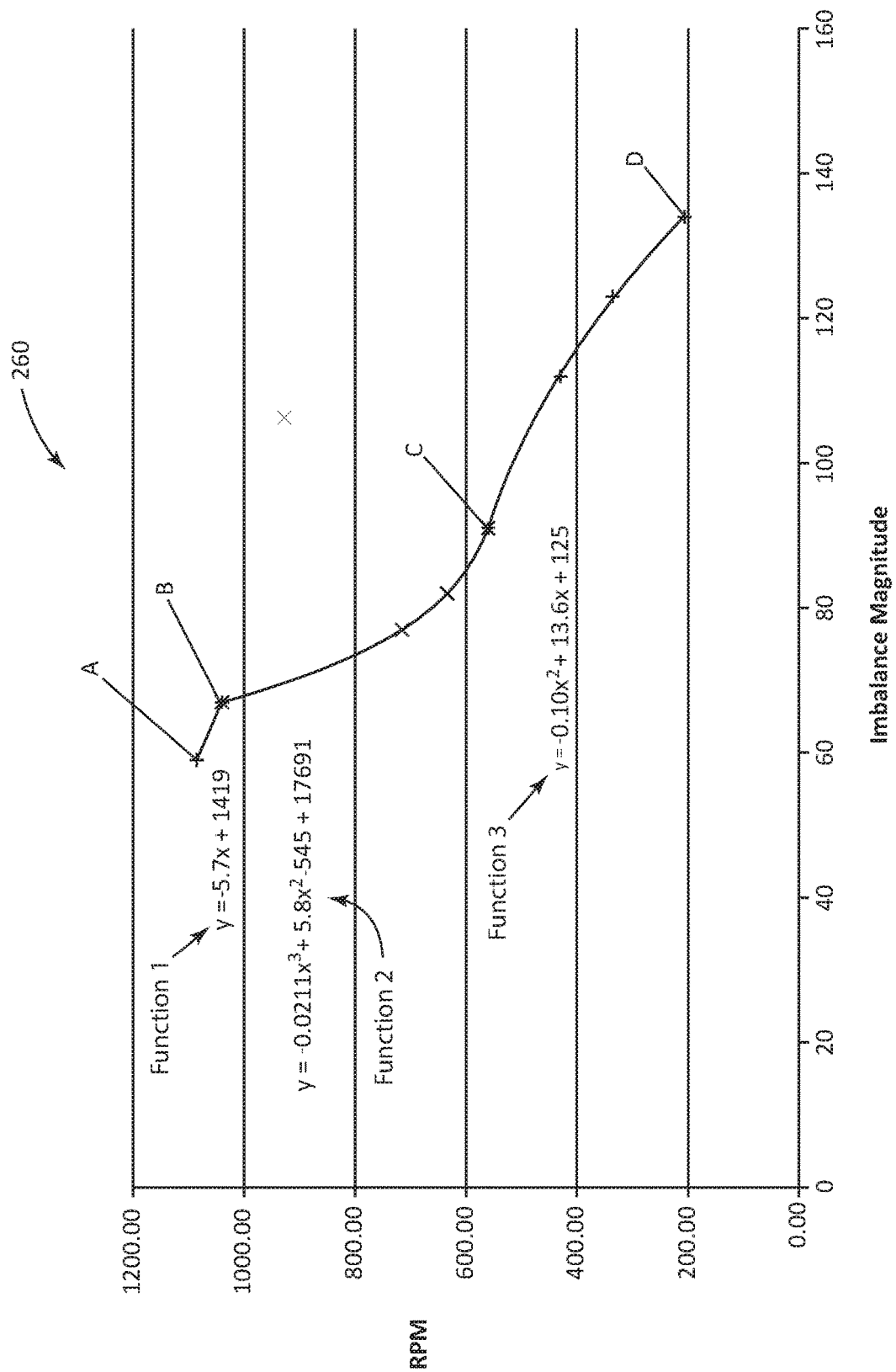
FIG. 5 is a graph representative of a speed of rotation of a laundry drum as a function of an imbalance magnitude of the laundry load according to an aspect of the present disclosure.

Referring now to FIGS. 4 and 5, the functions used in the extraction speed algorithm utilized in the method 200 of FIG. 3 can be obtained by analyzing data relating imbalance magnitude and an acceptable maximum allowable extraction speed using regression analysis. The data 250 and 260 in FIGS. 4 and 5 is not necessarily indicative of real data and is provided for the purposes of illustration only. The one or more functions of the extraction speed algorithm relate the magnitude of imbalance to a maximum allowable extraction speed over a range of imbalance magnitudes. The functions may be determined based on empirical and/or theoretical data relating a magnitude of imbalance with an acceptable maximum allowable extraction speed. In one example, a maximum allowable extraction speed may be determined experimentally based on test loads having a known magnitude of imbalance. The maximum allowable extraction speed may be based on a maximum speed that the drum can be rotated for a given imbalance magnitude such that operation of the washing machine 10 satisfies a predetermined acceptable or safe operating condition. The maximum allowable extraction speed that satisfies the predetermined safe operating condition may be based on any suitable criteria, non-limiting examples of which include a speed at which cabinet hits during spinning satisfy a predetermined threshold, a speed at which a noise level during spinning satisfy a predetermined threshold, and/or a percentage of the maximum allowable speed according to any suitable criteria.

The maximum allowable extraction speed may be determined experimentally for each model of washing machine 10 or the data from one or more different models may be used to extrapolate the maximum allowable extraction speed for a given imbalance magnitude to different models. The maximum allowable extraction speed may be determined over an entire range of imbalance magnitudes of interest or the maximum allowable extraction speed may be extrapolated from a sub-set of imbalance magnitudes within the range of interest.

Referring to FIG. 4, a range of data points 250 relating a maximum allowable extraction speed (in rotations per minute, RPM) to a particular imbalance magnitude for an exemplary washing machine is shown. At least some of the data points 250 are obtained experimentally. Optionally, some of the data points 250 may be estimates based on empirical data. The data 250 in FIG. 4 may be analyzed using regression analysis to provide one or more functions that model the data 250 to satisfy a predetermined degree of fit.

As illustrated in FIG. 4, the data 250 in FIG. 4 can be modeled using two functions, Function 1 and Function 2. Function 1 is a non-linear polynomial function that models the data between data point A and data point B; Function 2 is a linear function that models the remaining data 250 between data point B and data point C. The data 250 in FIG. 4 can be modeled using one or more functions that provides the highest degree of fit and/or a fit that satisfies a minimum fit threshold. The degree of fit can be determined according to any suitable analysis, a non-limiting example of which includes R-squared analysis. In one example, the number of functions used to model the data may be based on minimizing the use of functions having variables multiplied to powers greater than 4, optionally greater than 3. In another example, the functions used to model the data may be based on avoiding functions with little to no slope (i.e. functions with outputs that do not change much as the variable inputs change). In still another example, the data may be modeled using the minimum number of functions. Modeling the data may be based on any combination of these considerations and/or any additional considerations.

FIG. 5 illustrates a range of data points 260 relating a maximum allowable extraction speed to an imbalance magnitude for another exemplary washing machine different from that of FIG. 4. The data 260 in FIG. 5 can be modeled using three functions—Function 1, Function 2, and Function 3. Function 1 is a linear function that models the data 260 between data point A and data point B; Function 2 is a non-linear polynomial function that models the data between data point B and data point C; Function 3 is a non-linear polynomial function that models the data between data point C and D. The data 260 in FIG. 5 can be modeled using one or more functions that provides the highest degree of fit and/or a fit that satisfies a minimum fit threshold. The degree of fit can be determined according to any suitable analysis, a non-limiting example of which includes R-squared analysis.

The functions illustrated in FIGS. 4 and 5 can be utilized in the extraction speed algorithm for each particular washing machine in order to determine the maximum allowable extraction speed. Modeling the data using regression analysis provides a function that allows a unique maximum allowable spin speed to be determined for each unique input of imbalance magnitude. In this manner, the maximum allowable spin speed can be tailored according to the specific imbalance magnitude, which may provide benefits relating to time, energy, and/or amount of liquid extracted during an extraction phase.

Figure 6:
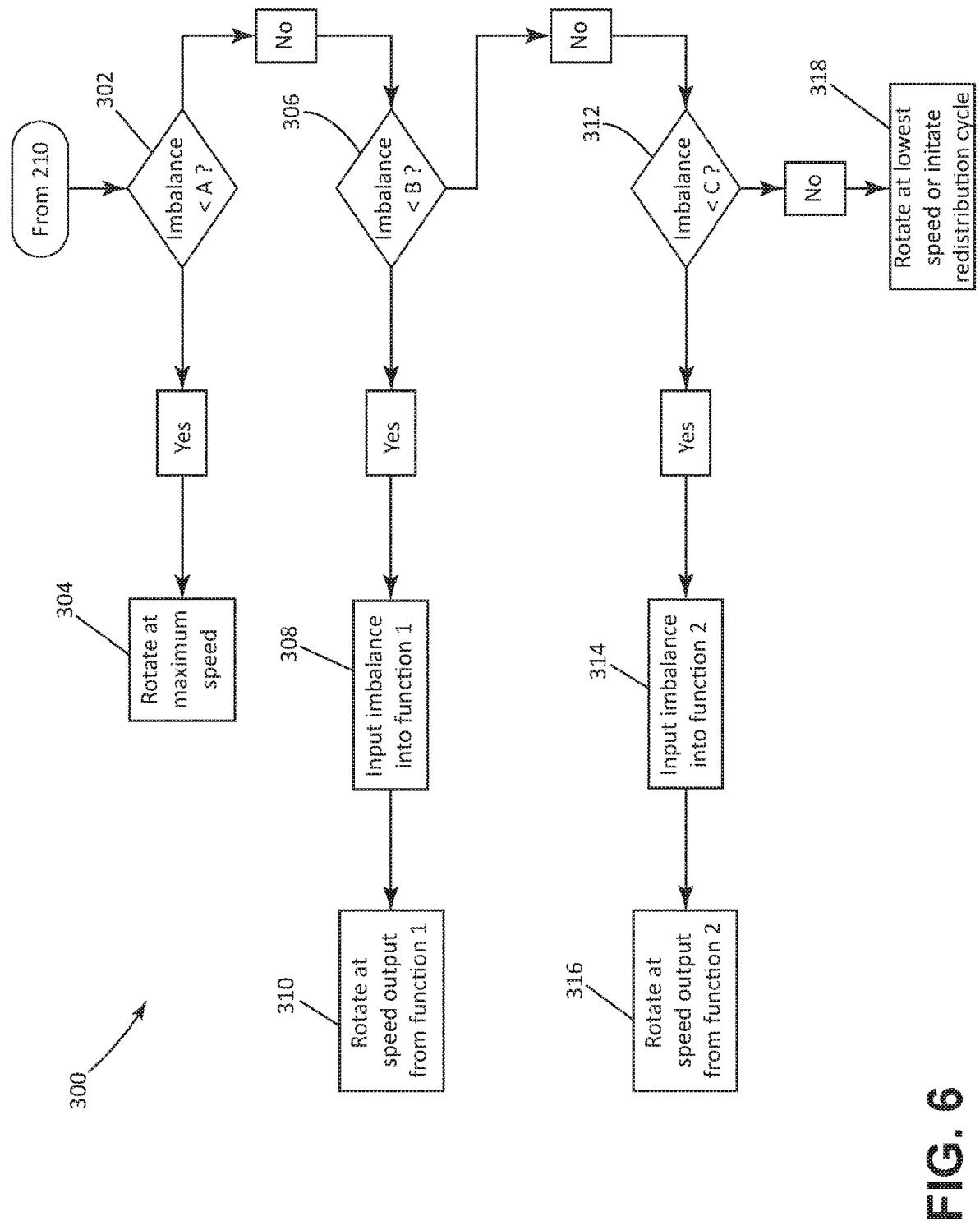
FIG. 6 is a flow chart illustrating a method of operating the laundry treating appliance according to an aspect of the present disclosure.

FIG. 6 illustrates an exemplary method 300 for determining the maximum allowable extraction speed at 212 of the method 200 of FIG. 3 using an extraction speed algorithm based on the exemplary data 250 of FIG. 4. While the method 300 is illustrated for use with the method 200 of FIG. 3, it is also contemplated that the method 300 may be utilized with alternative methods that include an extraction phase.

The method 300 includes decision making processes 302, 306, and 312 in which the imbalance magnitude is compared to predetermined thresholds that are based on the ranges of imbalance magnitude corresponding to each function used in the extraction speed algorithm. In the present example based on the exemplary data 250 of FIG. 4, each threshold A, B, and C of decision making process 302, 306, and 312 corresponds to the data points A, B, and C of FIG. 4 defining the limits of each function used to model the data 250.

The controller 96 is programmed to analyze the imbalance magnitude determined at 210 and determine if the imbalance magnitude satisfies a first threshold A at 302. If the imbalance magnitude satisfies the first threshold A, then controller 96 controls the motor 88 to rotate the drum 16 at a predetermined maximum speed at 304. Satisfying a threshold can include the imbalance magnitude being less than the threshold value, as illustrated, or may include being less than or equal to the threshold value. The controller 96 can then proceed to process 214 of the method 200 of FIG. 3 to rotate the drum 16 at the maximum speed and complete the cycle of operation at 216. In one example, the first threshold A may correspond to an imbalance magnitude that is low enough such that it is acceptable to rotate the drum 16 at the highest allowable speed.

If the imbalance magnitude does not satisfy the first threshold A, the process proceeds to 306 to determine whether the imbalance magnitude satisfies a second threshold B. If the imbalance magnitude satisfies the second threshold B, the imbalance magnitude is input into Function 1 of FIG. 4 at 308. The output from Function 1 is used to determine a maximum allowable extraction speed to rotate the drum 16 during the extraction phase. At 310 the controller 96 controls the motor 88 to rotate the drum 16 at the maximum allowable extraction speed determined from the output from Function 1 at 308. The controller 96 can then proceed to process 214 of the method 200 of FIG. 3 to complete the cycle of operation.

If the imbalance magnitude does not satisfy the second threshold B, the process proceeds to 312 to determine whether the imbalance magnitude satisfies a third threshold C. If the imbalance magnitude satisfies the third threshold C, the imbalance magnitude is input into Function 2 of FIG. 4 at 314. The output from Function 2 is used to determine a maximum allowable extraction speed to rotate the drum 16 during the extraction phase. At 316, the controller 96 controls the motor 88 to rotate the drum 16 at the maximum allowable spin speed determined from the output from Function 2 at 314. The controller 96 can then proceed to process 214 of the method 200 of FIG. 3 to complete the cycle of operation.

If the imbalance magnitude does not satisfy the third threshold C, at 318 the drum 16 may be rotated according to a minimum spin speed or a redistribution cycle may be initiated to decrease the imbalance magnitude. If a redistribution cycle is initiated, the method 300 may be repeated in order to determine the maximum allowable extraction speed. Additional decision making processes 302, 306, 312 can be implemented based on the number of functions utilized by the extraction speed algorithm. For example, the method 300 based on the exemplary data 260 of FIG. 5 would include a $4^{th}$ decision making process, subsequent to the decision making process 312. Each of the thresholds A, B, and, C of processes 302, 306, and 312 can be based on the range of imbalance magnitudes for each function utilized in the extraction speed algorithm.

The aspects described above can provide a variety of benefits in implementing a cycle of operation that includes an extraction phase to remove liquid from laundry. The extraction speed algorithm described herein can be used to provide a unique output indicative of a unique maximum allowable extraction speed for each magnitude of imbalance. This allows the drum to be rotated at a maximum extraction speed that is specifically suitable for that magnitude of imbalance. Increased extraction speeds can facilitate extracting liquid from the laundry at a greater rate, thus decreasing the amount of time required during the extraction phase to extract a predetermined amount of liquid and/or increasing the amount of liquid extracted within a given time period. Shorter extraction phases can decrease cycle time, which can increase convenience for the user and optionally use less energy. Decreasing the amount of liquid carried by the laundry when the extraction phase is complete can also decrease the time and/or energy required to dry the laundry, which may be convenient for the user and optionally be more cost effective.

Conventional washing machines will often utilize a look-up table that determines a single discrete maximum allowable extraction speed based on predetermined ranges of imbalance magnitude. For example, a conventional washing machine may include a look-up table that sets the maximum allowable extraction speed to 100 G when the imbalance magnitude is 0 to 10, 75 G when the imbalance magnitude is 11-20, and 50 G when the imbalance magnitude is 21-30. In this example, an imbalance magnitude of 21 would result in a maximum allowable extraction speed of 50 G. Because it is close to the next range, it may actually be acceptable to rotate the drum at the higher extraction speed of 75 G. However, because there is only a single discrete maximum allowable extraction speed for each range, the drum will be rotated at the slower speed, possibly forgoing one or more of benefits associated with rotating the drum at higher speeds discussed above.

In contrast, the methods described herein utilizing the extraction speed algorithm provide a unique output indicative of a unique maximum allowable extraction speed for each magnitude of imbalance, thus allowing the extraction phase to be tailored to the specific conditions of that particular laundry load. The use of non-linear polynomials to model the data of extraction speed based on imbalance magnitude can improve the estimation of a maximum allowable extraction speed that can be reached while still satisfying the predetermined safe operating conditions of the washing machine. Poor modeling may result in rotating at an extraction speed that causes undesirable operating conditions, such as undesirable vibrations and/or noises during the extraction phase.

As can be seen in the exemplary data of FIGS. 4 and 5, the relationship between a maximum allowable extraction speed for a given imbalance magnitude is not consistent throughout the range of imbalance magnitudes that may be encountered. Modeling the data using multiple functions, including at least one non-linear polynomial function, can improve the estimation of a maximum allowable extraction speed that satisfies the predetermined operating conditions of the washing machine over the range of imbalance magnitudes that may be encountered and can decrease the likelihood of an extraction speed that results in undesirable conditions.

Figure 7:
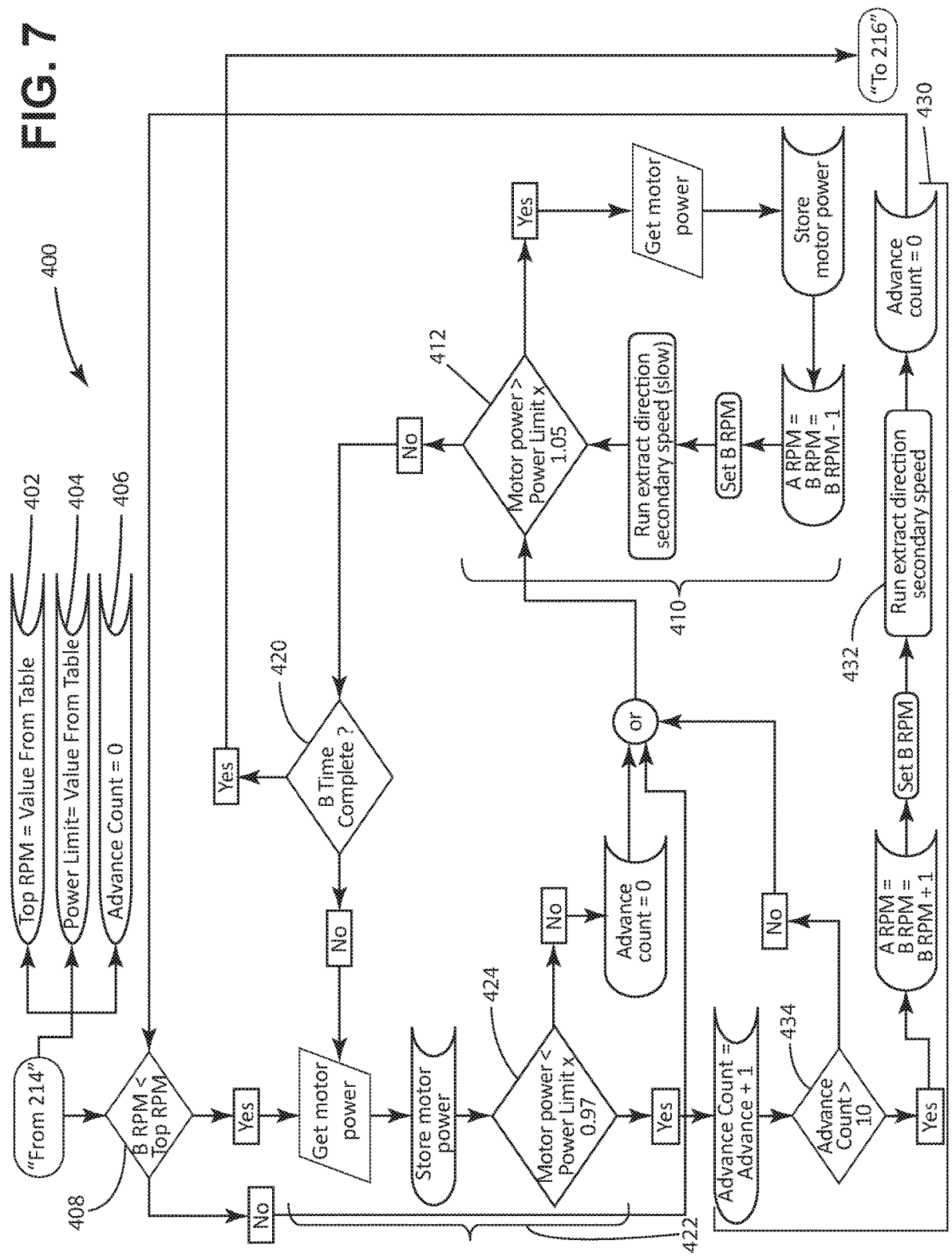
FIG. 7 is a flow chart illustrating a method of operating the laundry treating appliance according to an aspect of the present disclosure.

Referring now to FIG. 7, a method 400 for controlling the speed of rotation of the drum 16 during the extraction phase 208 is illustrated. While the method 400 is described in the context of the method 200 of FIG. 3, it is contemplated that the method 400 can be used with alternative methods that include an extraction phase.

The method 400 can be used to update the maximum allowable extraction speed during the extraction phase 208 after the drum 16 is rotated at the maximum allowable extraction speed at 214, which in this scenario can be referred to as an initial maximum allowable extraction speed. The method 400 utilizes information stored in the memory 100 of the controller 96 related to a stored maximum rotation speed ("Top RPM") 402 for the washing machine 10, a stored power limit 404 for the motor 88, and a starting Advance Count 406. The Top RPM 402 may be based on one or more factors, non-limiting examples of which include characteristics of the drum 16, tub 14, and suspension system 28, characteristics of the motor 88, and an amount of laundry present in the drum 16.

At 408, the controller 96 determines whether the initial maximum allowable extraction speed determined at 212 of the method of FIG. 3 ("B RPM") is less than the Top RPM. If the maximum allowable extraction speed B RPM is not less than the Top RPM, then the method proceeds to process 410 in which the motor power output is monitored and the extraction speed is controlled to maintain a predetermined safe operating condition. In the example of 410, the safe operating condition is based on operating the motor 88 at a power level that is not greater than a predetermined percentage of the maximum power limit 404 of the motor 88. The predetermined percentage may be 100% of the maximum power limit 404 or some percentage greater than or less than 100%. As illustrated in FIG. 7, the safe operating condition is set to 1.05 times the maximum power limit 404.

At 412, the controller 96 determines whether the current motor power output satisfies a first power threshold, such as 1.05 times the power limit. If the current motor power output satisfies the first power threshold at 412, then the process 410 is implemented to decrease the rotation speed of the drum 16 and thus decrease the power output of the motor 88. The process 410 can be repeated multiple times to incrementally decrease the rotation speed of the drum 16 until the current motor power output at 412 no longer satisfies the first power threshold.

If the current motor power output does not satisfy the first power threshold at 412, then at 420 it is determined whether the extraction phase is complete. In the example of FIG. 7, completion of the extraction phase is based on a predetermined time period. However, it is contemplated that completion of the extraction phase may be based on any suitable criteria, non-limiting examples of which include an amount of liquid extracted, a remaining moisture content of the laundry, and a rate of liquid extracted from the laundry. If the predetermined time period at 420 is satisfied, then the method 400 proceeds to 216 of the method 200 of FIG. 3 to complete the selected cycle of operation.

If the predetermined time period at 420 is not satisfied, then process 422 is implemented to continue rotating the drum 16 during the extraction phase. The process 422 includes monitoring the motor power at 424 to determine whether the current motor power satisfies a second power threshold. The second power threshold can be a predetermined percentage of the motor power limit, such as the example of 0.97 times the motor power limit 404 of FIG. 7. The second power threshold at 424 in combination with the first power threshold at 412 defines a motor power range within which it is acceptable for the motor 88 to be operated during rotation of the drum 16 at an extraction speed during the extraction phase.

During the extraction phase in which the drum 16 is being rotated at high speeds and liquid is being extracted from the laundry load, the characteristics of the laundry load can change. For example, as liquid is extracted from the laundry load, a mass of the laundry load may change and/or a distribution of laundry within the drum 16 may change. In another example, an imbalance magnitude or a position of an imbalance may change as liquid is extracted. Cycling between processes 410 and 422 allows the drum to be rotated at the initial maximum allowable spin speed as long as the motor power remains within an acceptable range, as defined by the first and second power thresholds at 412 and 424.

Process 410 provides a method by which the initial maximum allowable spin speed can be incrementally decreased if needed to maintain the motor power within the acceptable range defined by the first and second power thresholds 412 and 424. If the motor power never satisfies the first power threshold at 412, the drum 16 will continue to be rotated at the initial maximum allowable spin speed according to the cycle of operation. If a characteristic of the laundry load changes such that the motor power does satisfy the first power threshold at 412, the process 410 can be used to rotate the drum 16 at a new maximum allowable spin speed that results in the motor power not satisfying the first power threshold at 412.

Still referring to FIG. 7, an additional process 430 can be included in the method 400 to take advantage of the changing characteristics of the laundry load during the extraction phase to improve liquid extraction from the laundry load by increasing the maximum allowable spin speed to a new, higher maximum allowable spin speed, if conditions allow. As illustrated in FIG. 7, when the current motor power at 424 satisfies the second power threshold, the method advances to process 430 where the current maximum allowable speed B RPM can be incrementally increased at 432. The process 430 can be coupled with decision making at 408 such that processes 410 and 422 can be implemented to maintain the motor power within the limits defined by the first and second power thresholds at 412 and 424 and process 430 can be implemented to increase the maximum allowable spin speed from the current speed.

Process 430 can optionally be configured to incrementally increase the extraction speed only when the motor power satisfies the second power threshold at 424 a predetermined number of times at 434. For example, as illustrated in FIG. 7, the extraction speed will only be increased if the motor power satisfies the second power threshold at 424 a predetermined number of times, such as 10 times (shown). In the example illustrated in FIG. 7, the number of increases is limited to 10, although the limit may be set to any suitable number. The count decision at 434 may minimize effect of rapid changes in the laundry load as a result of transient laundry load conditions. Process 430 can optionally include a count decision at 434 such that the process 430 is limited to be implemented a predetermined number of times. In this manner, the number of times and/or the total amount of increase in the extraction speed during the extraction phase can be limited. For example, as illustrated in FIG. 7, the extraction speed will only be increased if the previous number of increases satisfies a predetermined number. In the example illustrated in FIG. 7, the number of increases is limited to 9, although the limit may be set to any suitable number.

As discussed above, as liquid is removed from the laundry load, one or more characteristics of the laundry may change, resulting in a new laundry load condition that is different from the condition during which the initial maximum allowable spin speed was determined at 212 of the method 200 of FIG. 3. The new condition may provide an opportunity to rotate the drum at a higher extraction speed, which may increase the efficiency of liquid extraction from the laundry load. Rotating at a higher extraction speed can potentially decrease cycle time and/or increase the efficiency of liquid extraction for a given cycle of operation.

For example, rotating at a higher extraction speed can extract more liquid from the laundry within a predetermined period of time, i.e. the rate of extraction may increase. Thus, the amount of liquid extracted within a predetermined period of time may increase, which may result in less energy used in a subsequent drying process. In another example, the rate of extraction can result in the laundry satisfying a given condition, such as a predetermined remaining moisture content, in less time, which may provide time and/or energy benefits. The process 430 provides an opportunity to increase the maximum allowable extraction speed during extraction based on changing conditions of the laundry load, even in situations in which the extraction speed may have been previously decreased according to process 410.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. For example, the features of the methods 200, 300, and/or 400, can be combined to make new methods, not explicitly described, or combined with additional methods without deviated from the scope of the invention.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of operating a laundry treating appliance in accordance with an automatic cycle of operation, the laundry treating appliance having a drum at least partially defining a treating chamber and rotatable about an axis of rotation, a motor configured to rotate the drum, a liquid supply system, and a controller configured to implement the cycle of operation, the method comprising:
    wetting a laundry load with liquid from the liquid supply system to form a wetted laundry load according to at least one of a wash phase or a rinse phase of a selected cycle of operation to define a selected phase;
    during the selected phase, rotating the drum;
    determining, by the controller, a magnitude of imbalance of the wetted laundry load based on an imbalance sensor output or based on at least one characteristic of the motor as output from the motor or a sensor operably coupled thereto;
    determining, by the controller, a first extraction speed for rotating the drum based on the magnitude of imbalance, wherein the controller is configured to provide the magnitude of imbalance as input into an algorithm that provides an output indicative of the first extraction speed, the algorithm comprising at least one non-linear polynomial function; and
    rotating the drum at the first extraction speed to extract at least a portion of the liquid carried by the wetted laundry load.

2. The method of claim 1, further comprising pre-rotating the drum at a second extraction speed, less than the first extraction speed, prior to rotating the drum at the first extraction speed.

3. The method of claim 1, further comprising determining, during the rotating of the drum at the first extraction speed, a power output of the motor.

4. The method of claim 3 wherein when the power output of the motor is less than a predetermined power limit of the motor, rotating the drum at a third extraction speed, greater than the first extraction speed.

5. The method of claim 4, further comprising repeatedly determining the power output of the motor and successively rotating the drum at increasing extraction speeds when the power output of the motor is less than a predetermined power limit of the motor.

6. The method of claim 1 wherein the algorithm provides a unique output indicative of a unique first extraction speed for each unique input.

7. The method of claim 1 wherein the algorithm comprises the at least one non-linear polynomial function, which defines a first non-linear polynomial function and a second function, different than the first non-linear polynomial function.

8. The method of claim 7, further comprising:
    when the magnitude of imbalance satisfies a first threshold, providing the magnitude of imbalance as input to the first non-linear polynomial function, which provides an output indicative of the first extraction speed; and
    when the magnitude of imbalance satisfies a second threshold, providing the magnitude of imbalance as input to the second function, which provides an output indicative of the first extraction speed.

9. The method of claim 8 wherein the second function is one of a linear function or a non-linear polynomial function.

10. The method of claim 7 wherein the algorithm further comprises a third function, different than the first non-linear polynomial function and the second function, the method further comprising:
    when the magnitude of imbalance satisfies a third threshold, providing the magnitude of imbalance as input to the third function, which provides an output indicative of the first extraction speed.

11. The method of claim 10 wherein the third function is one of a linear function or a non-linear polynomial function.

12. The method of claim 1, further comprising rotating the drum at the first extraction speed until a time threshold is satisfied.

13. The method of claim 1, further comprising rotating the drum at the first extraction speed until a threshold of a remaining moisture content of the wetted laundry load is satisfied, the remaining moisture content determined by a moisture sensor.

14. The method of claim 1, further comprising estimating a moisture content of the wetted laundry load to define an estimated remaining moisture content and further comprising rotating the drum at the first extraction speed until a threshold of the estimated remaining moisture content of the wetted laundry load is satisfied.

* * * * *